US007753745B2

(12) United States Patent
Schey et al.

(10) Patent No.: US 7,753,745 B2
(45) Date of Patent: Jul. 13, 2010

(54) STATUS INDICATORS FOR USE WITH A WATERCRAFT PROPULSION SYSTEM

(75) Inventors: Tyson Schey, Arlington, WA (US); Karen Suhre, Hawthorn Woods, IL (US)

(73) Assignee: Brunswick Corporation, Lake Forest, IL (US)

( * ) Notice: Subject to any disclaimer, the term of this patent is extended or adjusted under 35 U.S.C. 154(b) by 397 days.

(21) Appl. No.: 11/835,530

(22) Filed: Aug. 8, 2007

(65) Prior Publication Data

US 2009/0042460 A1 Feb. 12, 2009

(51) Int. Cl.
*B60K 26/00* (2006.01)

(52) U.S. Cl. ........................................ 440/2; 114/151

(58) Field of Classification Search ................. 114/151; 701/21; 440/1, 2, 6
See application file for complete search history.

(56) References Cited

U.S. PATENT DOCUMENTS 4,223,302 A 9/1980 Hocking
4,809,199 A 2/1989 Burgess et al.
5,043,727 A 8/1991 Ito
6,242,891 B1 6/2001 Parsonage
6,587,759 B2 7/2003 Obradovich et al.
6,882,289 B2 4/2005 Motsenbocker
7,015,822 B2 3/2006 Heiser, Jr. et al.
2003/0092328 A1 5/2003 Funayose et al.
2004/0090195 A1 5/2004 Motsenbocker
2006/0040570 A1 2/2006 Tsumiyama

OTHER PUBLICATIONS

International Searching Authority, International Search Report of PCT/US2008/070090, Oct. 14, 2008, 3 pages.
International Searching Authority, Written Opinion of the International Searching Authority of PCT/US2008/070090, Oct. 14, 2008, 6 pages.
International Bureau, International Preliminary Report on Patentability issued in corresponding PCT/US2008/070090, mailed Feb. 18, 2010, 6 pages.

*Primary Examiner*—Edwin Swinehart
(74) *Attorney, Agent, or Firm*—Hanely, Flight & Zimmerman, LLC

(57) ABSTRACT

Status indicators for use with a watercraft propulsion system are described. An example indicator includes a light operatively coupled to a propulsion system of a watercraft, wherein an operation of the light indicates a status of a thruster system of the propulsion system.

22 Claims, 4 Drawing Sheets

STATUS INDICATORS FOR USE WITH A WATERCRAFT PROPULSION SYSTEM

FIELD OF THE DISCLOSURE

The present disclosure relates to indicators and, more particularly, to status indicators for use with a watercraft propulsion system.

BACKGROUND

Vehicle or vessel propulsion systems often include various sensors, gauges, and detectors to monitor the many components of such systems. Information regarding the components can also be communicated to a user of the vehicle or vessel. Typically, the information is displayed near the controls (e.g., a steering mechanism) where the driver is likely to be present. For example, marine vessels have a limited power supply (e.g., fuel) that may be monitored to inform the driver of the vessel about the status of the power supply via a display (e.g., via a fuel gauge).

Additionally, marine vessels often include propulsion components supplemental to, for example, a main engine to enhance maneuverability. For example, a steering system of a vessel such as a boat or other watercraft may employ one or more thrusters to improve a driver's ability to control the vessel. Thrusters typically function by drawing water through a channel or inlet and propelling the water in a direction determined by a thruster controller (e.g., a joystick operable by a driver), thereby pushing the boat in a direction opposite to the output of the thruster. Such controls are especially helpful during docking maneuvers due to the ability of the thrusters to laterally direct the vessel. However, thrusters cannot be operated without limitation. As with other propulsion components, factors such as battery capacity restrict the duration for which a thruster may be used.

DETAILED DESCRIPTION

Figure 1:
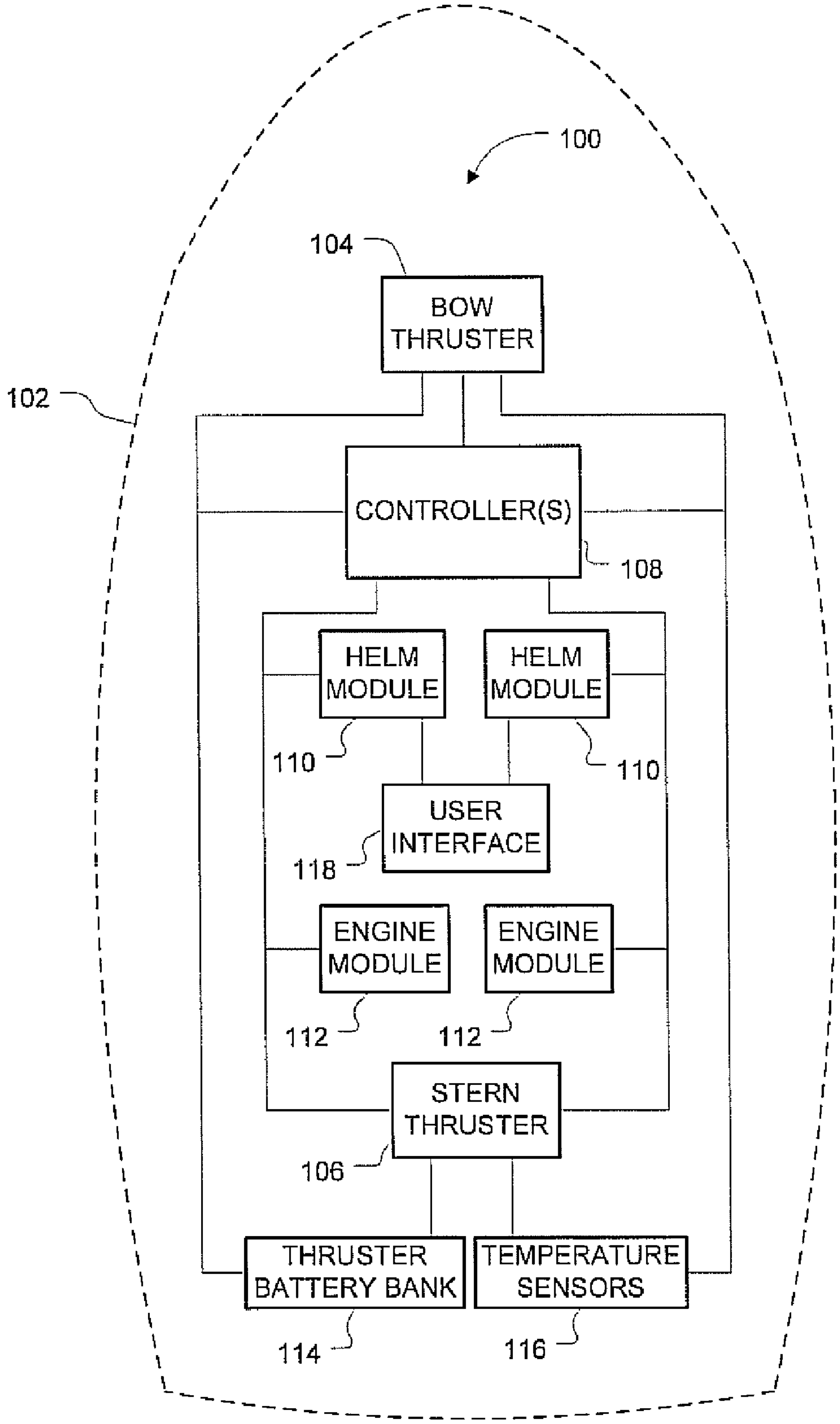
FIG. 1 is a schematic block diagram depicting an example control system for an example watercraft.

FIG. 1 is a schematic block diagram of the main components of an example control system 100 of an example watercraft 102. Specifically, the control system 100 includes a bow thruster 104, a stern thruster 106, a controller 108, helm modules 110, engine modules 112, a thruster battery bank 114, temperature sensors 116, and a user interface 118. While additional elements may be included in such a control system, FIG. 1 and its description are for illustrative purposes and, thus, are limited to the main components of the control system 100.

As shown in FIG. 1, the controller 108 is operatively coupled to the main components of the control system 100. The controller 108 receives information from the components (e.g., the temperature sensors 116, the thruster battery bank 114, the helm modules 110, etc.), processes the information and, in response, manipulates the control system 100 and its components (e.g., activates the bow thruster 104). The controller 108 may be implemented, for example, by a processing unit or system as described in connection with FIG. 4. Further, as indicated in FIG. 1, the control system 100 may include more than one controller. For example, the bow thruster 104 and the stern thruster 106 may each be associated with a separate controller. The number of controllers used may depend on processing or input/output capabilities or other design concerns.

The engine modules 112 and the associated engine components (not shown) are the main sources of propulsion for the watercraft 102 and may be operatively coupled to the controller 108 and the helm modules 110. The engine modules 112 may propel the watercraft 102 primarily in a forward or reverse direction (i.e., longitudinally along the watercraft 102). While FIG. 1 shows two engine modules 112, other examples may include an alternative number of engine modules positioned in varying locations and/or configurations on the watercraft 102.

The helm modules 110 may collectively or separately act as an interface between the controller 108 and a driver of the watercraft 102. FIG. 1 shows a user interface 118 coupled to the helm modules 110. The user interface 118 may include one or more mechanisms to allow a user to communicate with or otherwise manipulate the control system 100. The user interface 118 may include, for example, a joystick to interact with the engine modules and/or a keypad (e.g., the example keypad 200 of FIG. 2) to interact with the bow or stern thrusters 104 and 106. The user interface 118 may also include one or more dash modules (not shown) to convey information regarding the control system 100. Such dash modules may include a plurality of displays to convey messages to the driver regarding a plurality of readings, settings, options, and/or conditions. For example, the user interface 118 (e.g., via a dash module) may include a speedometer, a fuel gauge, or one or more indicators of a status of an element (e.g., a thruster) of a propulsion system, as described below in connection with FIGS. 2 and 3.

As noted above, the bow and stern thrusters 104 and 106 may be included to provide an added degree of maneuverability. More specifically, the thrusters 104 and 106 can generate lateral forces that propel the watercraft 102 sideways, thereby providing greater command or control over the movement of the watercraft 102. For example, the bow and/or stern thrusters 104 and 106 may be activated while docking to avoid contact with a bulkhead or another watercraft, which may lead to significant damage to all vessels involved in such a collision. The thrusters 104 and 106 may be used in concert or separately to direct the watercraft 102 in confined spaces or to maintain a position of the watercraft in open water (i.e., to anchor the watercraft 102 in a fixed position without the use of an anchor). The thrusters 104 and 106 may further include an interface system (e.g., a joystick or keypad coupled to a processor or controller) to convert general directional inputs from a driver into a calculated and precise combination of thruster operations. For example, the interface system may power each thruster separately and with different settings to produce a lateral force in a precise direction. Other example watercraft may include an alternative number or configuration of bow and/or stern thrusters to augment the steering system or to simplify the interaction between a driver and a control system of a watercraft.

The control system 100 may also include temperature sensors 116 coupled to the controller 108 and/or additional components (e.g., the thrusters 104 and 106) of the watercraft 102. The temperature sensors 116 may detect or monitor multiple components to avoid any damage that may be caused by an increased or decreased temperature. For example, the thrusters 104 and 106 may become damaged from overheating if they are continuously active for extended periods of time. In other words, certain components (e.g., the thrusters 104 and 106) have an intrinsic thermal capacity and may employ cooling mechanisms or techniques to monitor the capacity. Thus, the temperature sensors 116 may be used to closely monitor the status of each component susceptible to overheating.

Further, as shown in FIG. 1, the thrusters 104 and 106 may be powered by an independent thruster battery bank 114, which may be coupled to the controller 108. While FIG. 1 illustrates an independent thruster battery bank 114, other example control systems may allow thrusters to draw power from other sources (e.g., a main battery bank). As the watercraft 102 may rely on all of the battery banks that may be onboard, the controller 108 may be operatively coupled to each battery to monitor its status (e.g., a remaining voltage or capacity).

Figure 2:
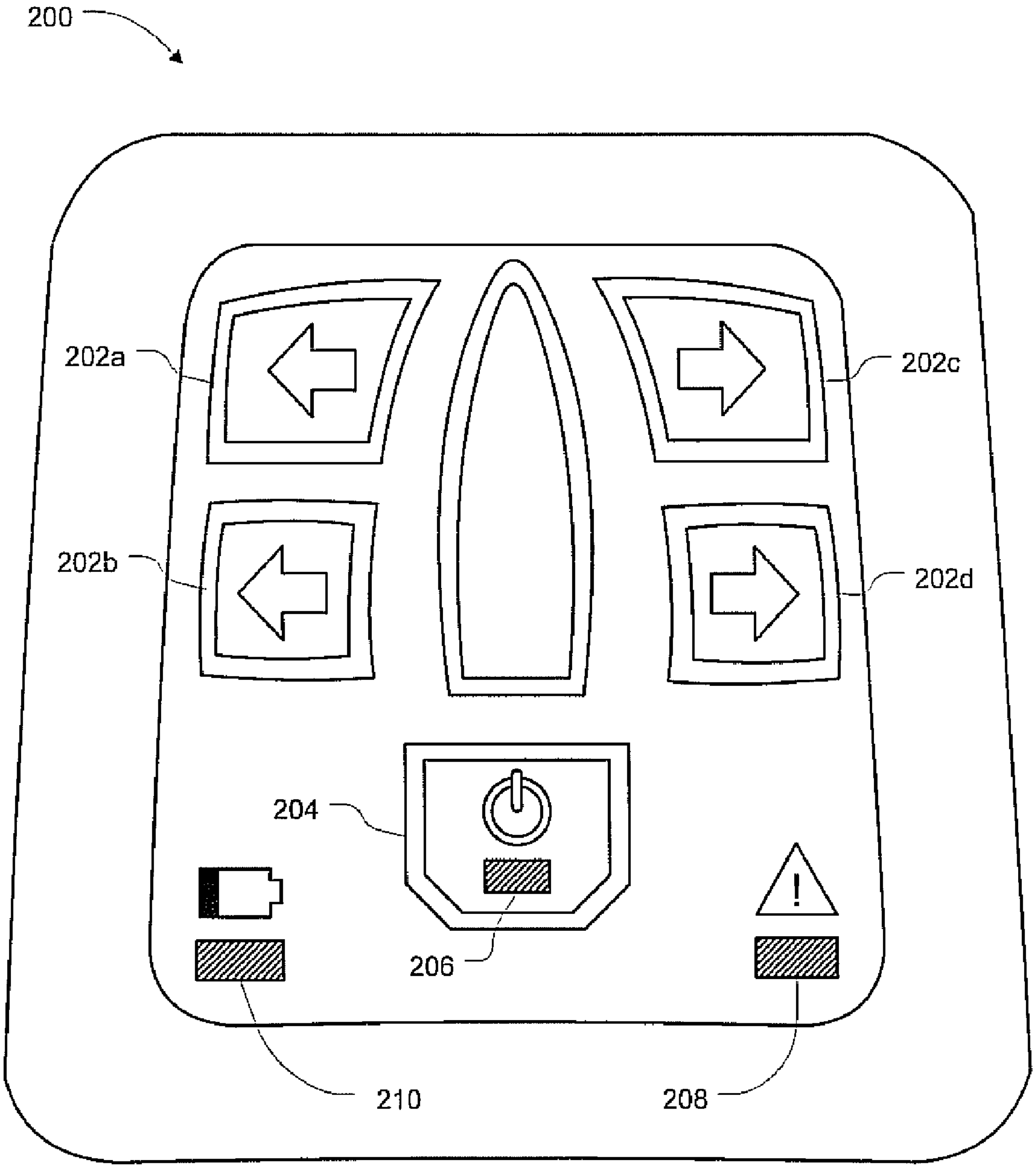
FIG. 2 illustrates an example keypad to operate a plurality of thrusters.

As noted above, a watercraft may include a variety of input mechanisms or devices to operate or control different propulsion components. FIG. 2 illustrates an example keypad 200 configured to operate a plurality of thrusters (e.g., the thrusters 104 and 106 of FIG. 1). The example keypad 200 includes a plurality of buttons 202 corresponding to each thruster and a direction of propulsion for the same. For example, a driver may engage button 202*a* to activate a bow thruster in a port direction; button 202*b* to activate a stern thruster in a port direction; button 202*c* to activate a bow thruster in a starboard direction; and/or button 202*d* to activate a stern thruster in a starboard direction. Further, the keypad 200 may include a power button 204 to activate or deactivate the thruster system. The power button 204 may include a light 206 that may be illuminated or changed to a different color upon activation or deactivation of the thruster system. The keypad 200 may also include a fault light 208 to indicate that a system fault (e.g., a power failure) has occurred and, for example, that an element of a control system (e.g., the control system 100 of FIG. 1) has to be shut down.

Further, the example keypad 200 includes a thruster system status light 210. As noted above, thrusters (e.g., the thrusters 104 and 106 of FIG. 1) may be susceptible to overheating and, where the thrusters are battery powered, they cannot operate continuously for extended durations of time. In other words, thrusters have a capacity of operation that, if exceeded, may require the thrusters to be disabled. Thus, to indicate the status (e.g., amount of remaining thruster capacity) of one or more thrusters to a driver, the keypad 200 includes the thruster system status light 210. Alternatively, the thruster system status light 210 may be positioned elsewhere on a helm or in another suitable location of the watercraft.

The thruster system status light 210 is affected by, for example, readings taken from temperature sensors (e.g., the temperature sensors 116 of FIG. 1) and/or the voltage of a battery bank that powers the thrusters (e.g., the thruster battery bank 114 of FIG. 1). In operation, the thruster system status light 210 may flash and/or illuminate to alert the driver of a limited or low thruster capacity or condition. For example, where the temperature of a thruster is at a high value and/or the battery voltage is at a low value, the controller may determine that the thruster is in a state that requires the thruster to be disabled. Additionally or alternatively, a warning capacity level may correspond to a state in which the thruster is approaching a potentially inoperative state. For example, the temperature sensors may detect a temperature at which the thruster may properly operate but is also nearing a temperature at which the thruster will be inoperative or disabled. In another example, a warning capacity level may exist where the thruster battery voltage is currently sufficient but nearing a low capacity level.

Figure 3:
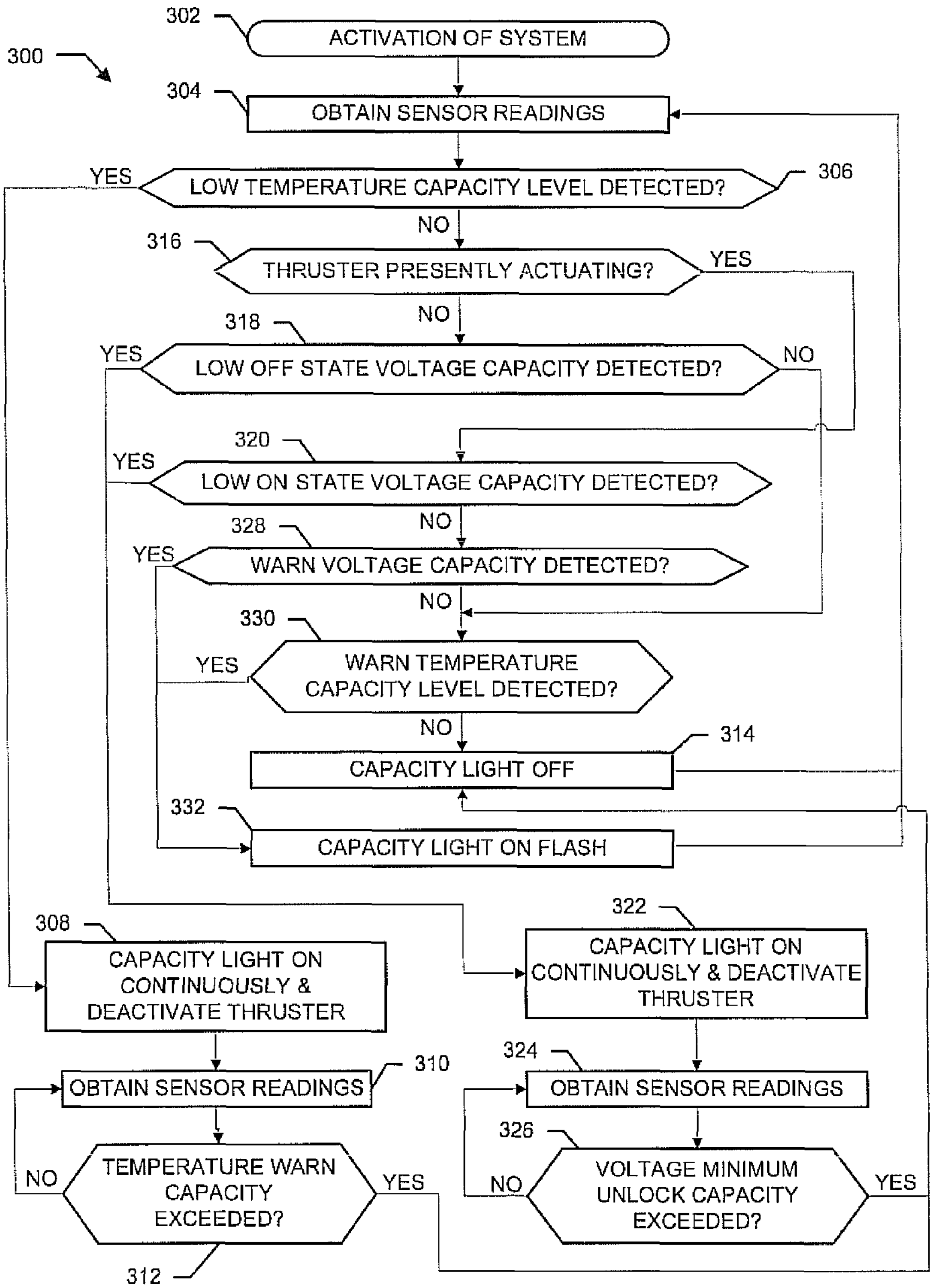
FIG. 3 is a flowchart representing an example process that may be performed by an example thruster system status indicator.

FIG. 3 is a flowchart representing an example process 300 that may be performed by an example thruster system status indicator (e.g., the thruster system status light 210 of FIG. 2). During the activation of the thruster system (block 302), readings may be obtained from sensors (e.g., temperature sensors or battery voltage detectors) (block 304). The readings may be communicated to a controller (e.g., the controller 108 of FIG. 1) to determine a remaining thruster system capacity (not shown). In another example, the readings may be obtained before or after the activation of the system.

If the process 300 determines that a low temperature capacity level is detected (block 306), the thruster system status indicator may be illuminated (i.e., continuously on) and the thruster system may be deactivated (block 308). Sensor readings may then be taken (block 310) until a temperature warning capacity (e.g., a threshold capacity defined as an acceptable level at which the thruster system may be effectively activated) is exceeded (block 312), at which point the thruster system status indicator may be turned off (block 314).

The process 300 also detects an unsatisfactory voltage capacity. If the thruster system is not currently actuating a thruster (i.e., the thruster system is not activating a thruster or effectuating a propulsion via a thruster) (block 316), the process 300 determines if a low off-state voltage capacity is present (block 318). When the thruster system is actuating a thruster (block 316), the process 300 determines if a low on-state voltage capacity is present or detected (block 320). In other words, the system may include separate threshold voltage capacities to compare with the sensor readings depending on the state (e.g., actuating or not actuating a thruster) of the thruster system. In the example process 300, where either a low on-state or off-state voltage capacity is detected, the thruster system status indicator may be illuminated (i.e., continuously on) and the thruster system may be deactivated (block 322). Sensor readings may be taken (block 324) until a voltage minimum unlock capacity (e.g., a threshold capacity defined as an acceptable level at which the thruster system may be effectively activated) is exceeded (block 326), at which point the thruster system status indicator may be turned off (block 314).

When neither a low temperature capacity nor a low voltage capacity is detected, the process 300 may then determine whether a warning voltage capacity (e.g., a threshold voltage level that is approaching a low voltage capacity) (block 328) or a warning temperature capacity (e.g., a threshold temperature capacity that is approaching a low temperature capacity) (block 330) is present. Where either warning capacity is detected, the process 300 may cause the thruster system status indicator to begin flashing (block 332). The process 300 may then return to obtaining sensor readings (block 304) to determine the status of the thruster system (e.g., whether the warning capacity level has entered a low capacity level, whereby the thruster system needs to be deactivated).

Generally, a thruster system status indicator (e.g., the thruster system status light 210 of FIG. 2) may be flashed and/or illuminated continuously to inform a driver that the associated thruster(s) may soon be disabled or inoperative or has been disabled or rendered inoperative. As discussed above, propulsion components, including thrusters, may be automatically shutdown (i.e., disabled or rendered inoperative) after being active for a duration of time to protect or preserve the thruster (i.e., to maintain the working condition of the thruster). In particular, thrusters are often used for difficult docking maneuvers, during which a watercraft may be exposed to potentially hazardous conditions. For example, a dock or pier may have a significant amount of other watercraft simultaneously maneuvering through close quarters. Further, a docking slip may not include significant room for error, as the watercraft may experience damaging impact with its surroundings without proper steering. Such damage is difficult to repair and the costs are considerable.

Additionally, where a driver of a watercraft is inexperienced or has come to rely on a thruster system to maneuver the watercraft, the driver may have a limited ability to properly operate the watercraft without the thruster system. Thus, the example thruster system status indicators described herein provide the driver with sufficient warning before any maneuver is attempted. For example, where a driver is aware that the thrusters will likely be needed or active for a significant time, the driver may utilize the thruster system status indicator to ensure that a low or warning thruster capacity level is not present. Further, the driver may realize, via the thruster system status indicator, that current docking maneuvers must soon be completed because thruster capacity is nearly depleted.

Figure 4:
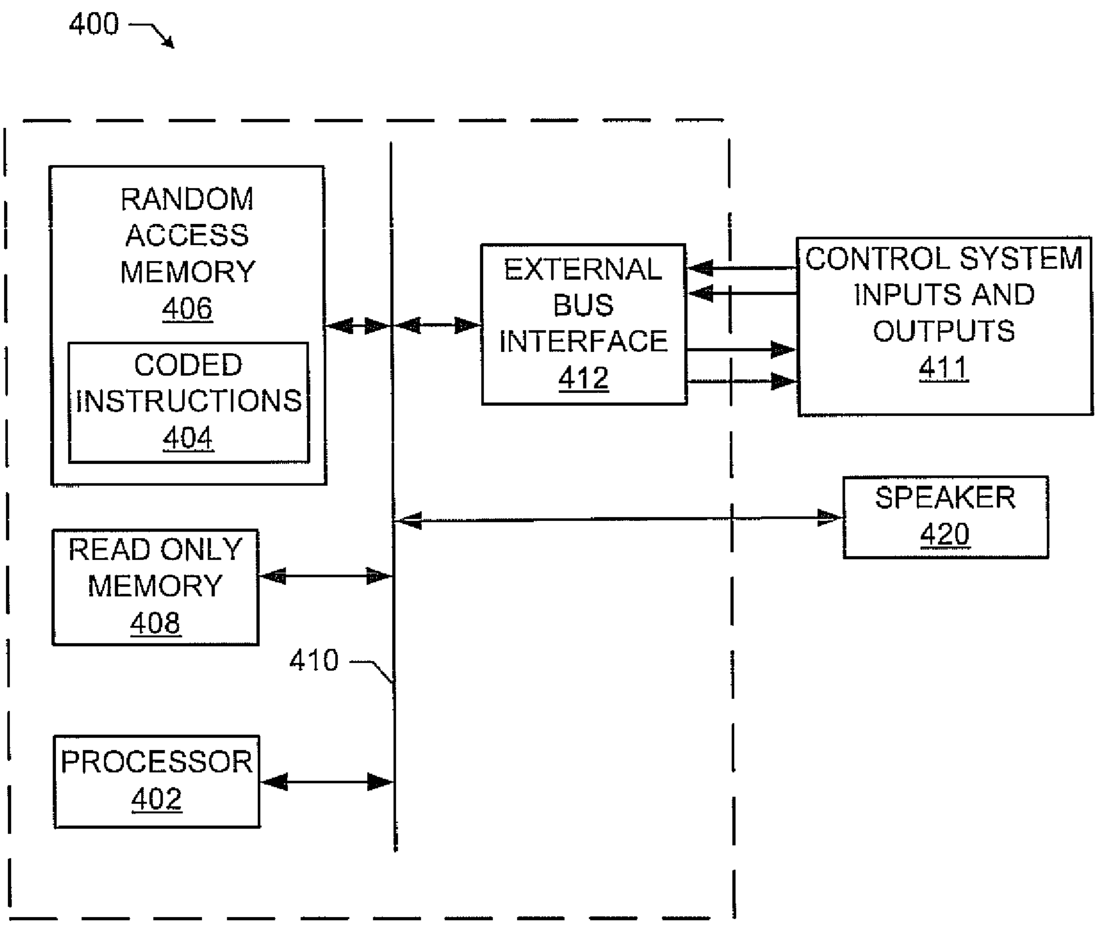
FIG. 4 is an example implementation of the example controller of FIG. 1.

FIG. 4 is an example implementation of an example controller 400 (e.g., the controller 108 of FIG. 1). To process and analyze the information generated by the components (e.g., the temperature sensors 116 or thruster battery bank 114 of FIG. 1) of a control system of a watercraft, an example processing unit 400 includes a general purpose programmable processor 402. The example processor 402 executes coded instructions 404 present in a main memory (e.g., within a random access memory (RAM) 406 as illustrated and/or within a read only memory (ROM) 408). The example processor 402 may be any type of processing unit, such as a microprocessor from the AMD®, Sun® and/or Intel® families of microprocessors. The example processor 402 may execute, among other things, machine accessible instructions to perform the example process of FIG. 4 and/or the other processes described herein.

The example processor 402 is in communication with the example main memory (including the ROM 408 and the RAM 406) via a bus 410. The example RAM 406 may be implemented by dynamic random access memory (DRAM), Synchronous DRAM (SDRAM), and/or any other type of RAM device, and the example ROM 408 may be implemented by flash memory and/or any other desired type of memory device. Access to the example memories 408 and 406 may be controlled by a memory controller (not shown) in a conventional manner.

To receive or send control system inputs and outputs 411, the example processing unit 400 includes any variety of conventional interface circuitry such as, for example, an external bus interface 412. For example, the external bus interface 412 may provide one input signal path (e.g., a semiconductor package pin) for each component output. Additionally or alternatively, the external bus interface 412 may implement any variety of time multiplexed interface to receive output signals from the components via fewer input signals. Further, the bus interface 412 may provide a plurality of output signal paths for component inputs (i.e., signals to instruct the control system components).

To allow the example processing unit 400 to generate sounds, the example processing unit 400 may be operatively coupled to any variety of speaker 420. Although an example processing unit 400 has been illustrated in FIG. 4, processor and display units may be implemented using any of a variety of other and/or additional devices, components, circuits, modules, etc. Further, the devices, components, circuits, modules, elements, etc. illustrated in FIG. 4 may be combined, re-arranged, eliminated and/or implemented in any of a variety of ways.

Although certain example methods and apparatus have been described herein, the scope of coverage of this patent is not limited thereto. On the contrary, this patent covers all methods and apparatus fairly falling within the scope of the appended claims either literally or under the doctrine of equivalents.

What is claimed is:

1. An indicator for use with a watercraft propulsion system comprising:

a first light operatively coupled to a thruster system having at least two thrusters, wherein an operation of the first light indicates a temperature status of the thruster system;

a second light operatively coupled to a thruster battery of the thruster system, wherein operation of the second light indicates a voltage level of the thruster battery relative to a voltage capacity level of the thruster battery; and a control system to disable the thruster system when the control system detects that the first light and the second light have been active for a predetermined amount of time.

2. An indicator as defined in claim 1, wherein the first light or the second light is disposed on a thruster system control mechanism.

3. An indicator as defined in claim 1, wherein the second light flashes to warn a user when the voltage level of the thruster battery decreases below a threshold voltage level.

4. An indicator as defined in claim 1, wherein the first light illuminates to indicate a condition in which at least one of the thrusters is approaching a temperature greater than a threshold temperature.

5. An indicator as defined in claim 4, wherein the first light remains illuminated until the condition is no longer present.

6. An indicator as defined in claim 1, wherein the second light illuminates to indicate a condition in which the voltage level of the thruster battery is approaching a voltage level that is insufficient to operate the thruster system.

7. An indicator as defined in claim 4, wherein the at least one of the thrusters is disabled in response to the thruster having a temperature greater than the threshold temperature.

8. An indicator of claim 4, wherein the threshold temperature is a temperature at which the thrusters are disabled.

9. An indicator as defined in claim 6, wherein the second light remains illuminated until the condition is no longer present.

10. An indicator as defined in claim 1, wherein the first light flashes to warn a user when the temperature of one of the at least two thrusters is greater than a threshold temperature.

11. A method of to detect a status of a thruster system of a watercraft comprising:

operatively coupling a light to the thruster system of a propulsion system, the thruster system having at least two thrusters;

detecting a temperature of one of the at least two thrusters to determine a temperature status of the thruster system;

detecting a voltage level of a battery operatively coupled to the thruster system; and operating the light in response to a temperature of the thruster system being greater than a threshold temperature value and the voltage level of the battery being less than a threshold voltage level.

12. A method as defined in claim 11, wherein the light is disposed on a thruster system control mechanism.

13. A method as defined in claim 11, further comprising detecting a condition of the thruster system based on the temperature of the thruster system and the voltage level of the battery.

14. A method as defined in claim 13, further comprising flashing the light in response to detection of a condition in which the voltage level of the battery is insufficient to power the thruster system and a temperature of the thruster system is greater than the threshold temperature.

15. A method as defined in claim 11, further comprising illuminating the light in response to detection of a condition that requires the thruster system to be disabled.

16. A method as defined in claim 15, wherein the light remains illuminated until the condition is no longer present.

17. A method as defined in claim 15, further comprising disabling the thruster system in response to detecting that the light has been illuminated for a predetermined amount of time.

18. A method as defined in claim 14, further comprising disabling the thruster system in response to detecting the condition in which both the temperature of the thruster system is greater than the threshold temperature value and the voltage level of the battery is less than the threshold voltage level.

19. A watercraft comprising:

a propulsion system including at least two thrusters;

a first sensor to detect a temperature of at least one of the thrusters;

a second sensor to detect a voltage level of a thruster battery operatively coupled to the thrusters;

a light operatively coupled to the at least two thrusters and the thruster battery; and a means for determining a capacity level of the thrusters based on the voltage level of the battery and the temperature of the at least one of the thrusters, and wherein the means for determining a capacity level causes the light to operate to indicate the capacity level of the thrusters to a user based on the voltage level of the battery and the temperature of the at least one of the thrusters.

20. A watercraft as defined in claim 19, wherein the light flashes to indicate a warning level of thruster capacity and illuminates to indicate a condition to disable the thrusters.

21. A watercraft as defined in claim 19, further comprising a control system to disable the thruster system when the control system detects that the capacity level of the thrusters is below a threshold capacity level.

22. A watercraft as defined in claim 19, wherein the threshold capacity level comprises a capacity level at which the temperature of the thrusters is approaching a temperature at which the thrusters malfunction and the voltage level of the battery bank is approaching a voltage level that is insufficient to operate the thrusters.

* * * * *

UNITED STATES PATENT AND TRADEMARK OFFICE

CERTIFICATE OF CORRECTION

PATENT NO. : 7,753,745 B2
APPLICATION NO. : 11/835530
DATED : July 13, 2010
INVENTOR(S) : Schey et al.

It is certified that error appears in the above-identified patent and that said Letters Patent is hereby corrected as shown below:

Column 6, line 53 (claim 11), after “method” delete “of”.

Signed and Sealed this
First Day of February, 2011

David J. Kappos
*Director of the United States Patent and Trademark Office*